(12) United States Patent
Little

(10) Patent No.: US 11,314,544 B2
(45) Date of Patent: Apr. 26, 2022

(54) TRANSACTION LOG FOR AUDIT PURPOSES

(71) Applicant: Red Hat, Inc., Raleigh, NC (US)

(72) Inventor: Mark Cameron Little, County Durham (GB)

(73) Assignee: RED HAT, INC., Raleigh, NC (US)

( * ) Notice: Subject to any disclaimer, the term of this patent is extended or adjusted under 35 U.S.C. 154(b) by 819 days.

(21) Appl. No.: 14/617,001

(22) Filed: Feb. 9, 2015

(65) Prior Publication Data
US 2016/0232178 A1 Aug. 11, 2016

(51) Int. Cl.
*G06F 16/00* (2019.01)
*G06F 9/46* (2006.01)
*G06F 11/14* (2006.01)
*G06F 11/34* (2006.01)

(52) U.S. Cl.
CPC .............. *G06F 9/466* (2013.01); *G06F 11/14* (2013.01); *G06F 11/1474* (2013.01); *G06F 11/3476* (2013.01); *G06F 2201/87* (2013.01)

(58) Field of Classification Search
CPC ......... G06F 17/30227; G06F 17/30377; G06F 11/1474; G06F 9/466; G06F 11/14; G06F 11/3476; G06F 2201/87
See application file for complete search history.

(56) References Cited

U.S. PATENT DOCUMENTS

| | | | | |
|---|---|---|---|---|
| 5,335,343 A * | 8/1994 | Lampson | ................ | G06F 9/466 707/999.202 |
| 5,390,302 A * | 2/1995 | Johnson | .................. | G06F 9/466 709/230 |
| 5,428,771 A * | 6/1995 | Daniels | ................... | H04L 29/06 370/466 |
| 5,452,445 A * | 9/1995 | Hallmark | ............ | G06F 16/2379 |
| 5,504,900 A * | 4/1996 | Raz | ......................... | G06F 9/466 |
| 5,884,327 A * | 3/1999 | Cotner | ............... | G06F 16/2379 |
| 6,185,699 B1 * | 2/2001 | Haderle | ................. | G06F 9/466 714/19 |
| 6,266,698 B1 | 7/2001 | Klein et al. | | |
| 6,295,548 B1 * | 9/2001 | Klein | ...................... | G06F 9/466 707/999.01 |
| 6,463,456 B1 * | 10/2002 | Kan | ........................ | G06F 9/466 709/201 |
| 6,470,342 B1 * | 10/2002 | Gondi | ..................... | G06F 9/466 |
| 6,510,421 B1 * | 1/2003 | Ganesh | ............ | G06F 17/30362 |
| 6,671,704 B1 | 12/2003 | Gondi et al. | | |

(Continued)

OTHER PUBLICATIONS

Moving the Transaction Log, 12 pages, http://codeverge.com/sybase.sqlserver.admin/moving-the-transaction-log/930565.

(Continued)

*Primary Examiner* — Debbie M Le
*Assistant Examiner* — Huen Wong
(74) *Attorney, Agent, or Firm* — Haynes and Boone, LLP

(57) ABSTRACT

Methods, systems, and computer program products are included for performing a transaction, where log entries pertaining to the transaction are maintained following the transaction for audit purposes. The log entries may include information about the transaction at various stages, including time information, information regarding operations performed, state information and originator information.

20 Claims, 5 Drawing Sheets

(56) References Cited

U.S. PATENT DOCUMENTS

| | | | |
|---|---|---|---|
| 6,895,529 B2* | 5/2005 | Egolf | G06F 11/1474 714/15 |
| 7,168,001 B2 | 1/2007 | Johnson et al. | |
| 7,305,678 B2* | 12/2007 | Perks | G06F 9/466 707/999.008 |
| 7,337,188 B2* | 2/2008 | Somogyi | G06F 9/466 |
| 8,024,296 B1 | 9/2011 | Gopinathan et al. | |
| 8,346,851 B2* | 1/2013 | Little | G06F 9/466 709/203 |
| 8,464,270 B2* | 6/2013 | Little | G06F 16/214 718/106 |
| 8,799,225 B2 | 8/2014 | Vaitzblit et al. | |
| 2004/0236989 A1* | 11/2004 | Pavlik | H04L 67/10 714/15 |
| 2007/0005665 A1 | 1/2007 | Vaitzblit | |
| 2009/0157536 A1 | 6/2009 | Kikuchi | |
| 2010/0185847 A1* | 7/2010 | Shasha | G06F 11/1004 713/150 |
| 2011/0145204 A1* | 6/2011 | Maple | G06F 11/2028 707/682 |
| 2012/0011100 A1* | 1/2012 | Yamane | G06F 17/30348 707/649 |
| 2012/0102006 A1* | 4/2012 | Larson | G06F 17/30575 707/703 |
| 2013/0132458 A1* | 5/2013 | Little | G06F 9/466 709/201 |
| 2013/0226890 A1* | 8/2013 | Markus | G06F 16/2365 707/703 |
| 2013/0226891 A1* | 8/2013 | Markus | G06F 16/2329 707/703 |
| 2014/0337303 A1* | 11/2014 | Little | G06F 9/466 707/703 |
| 2016/0037469 A1* | 2/2016 | Smith | H04W 56/0025 370/312 |
| 2016/0210322 A1* | 7/2016 | Little | G06F 16/2343 |
| 2016/0210627 A1* | 7/2016 | Little | G06Q 40/02 |

OTHER PUBLICATIONS

Top ApexSQL Log FAQs with Detailed Answers, 2014, 2 pages, http://knowledgebase.apexsql.com/top-apexsql-log-faqs-with-detailed-answers/.

IB LogManager Product Family, Copyright© 1999-2014 Upscene Productions, http://www.upscene.com/database_auditing/firebird_and_interbase/.

* cited by examiner

TRANSACTION LOG FOR AUDIT PURPOSES

BACKGROUND

The present disclosure relates generally to transactions, and more particularly to methods and systems for retaining transaction logs.

Transactions are performed in distributed computing environments. A protocol that includes a set of properties known as ACID (atomicity, consistency, isolation, and durability) is used to process the transactions in order to guarantee that the transactions are processed reliably in the distributed environment. Protocols that are known to implement the ACID properties include protocols such as the two-phase commit protocol and the three-phase commit protocol. These protocols may be referred to as ACID transaction protocols.

Typical distributed computing environments may perform large numbers of transactions. To improve processing speeds and ensure reliability, optimizations may be implemented in the transaction protocols. Optimizations may include removing transaction logs during garbage collection or deleting specific transaction logs entries to indicate that a transaction is complete.

BRIEF SUMMARY

According to an example, a computer-implemented method includes receiving, at a transaction coordinator, a request to commit a transaction. The method further includes sending, from the transaction coordinator, a prepare message to a participant. The method further includes receiving, at the transaction coordinator, a response to the prepare message from the participant, the response to the prepare message identifying that the participant is prepared to commit the transaction. The method further includes writing, at the transaction coordinator, a first transaction log entry to a first location, wherein the first transaction log entry identifies a first timestamp, a first operation, a parameter of the first operation, a first state, and an originator. The method further includes sending, from the transaction coordinator, a commit message to the participant. The method further includes receiving, at the transaction coordinator, a response to the commit message from the participant. The method further includes moving the first transaction log entry from the first location to a second location.

According to an example, a non-transitory computer-readable medium includes instructions to receive a request to commit a transaction. The medium further includes an instruction to send a first message to a participant. The medium further includes an instruction to receive a response to the first message from the participant, the response to the first message identifying that the participant is prepared to commit the transaction. The medium further includes an instruction to write a first transaction log entry to a first location. The medium further includes an instruction to send, from the transaction coordinator, a second message to the participant. The medium further includes an instruction to receive, at the transaction coordinator, a response to the second message from the participant. The medium further includes an instruction to move the first transaction log entry from the first location to a second location.

According to an example, a system includes a transaction coordinator having a processor and a memory, the transaction coordinator to process a transaction by: writing a first commit transaction log entry to a first memory location; and moving the first commit transaction log entry from the first memory location to a second memory location. The system further includes a participant communicatively coupled to the transaction coordinator, the participant to process the transaction by: writing a prepare transaction log entry to a third memory location; writing a second commit transaction log entry to a fourth memory location; moving the prepare transaction log entry from the third memory location to a fifth memory location; and moving the second commit transaction log entry from the fourth memory location to a sixth memory location.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
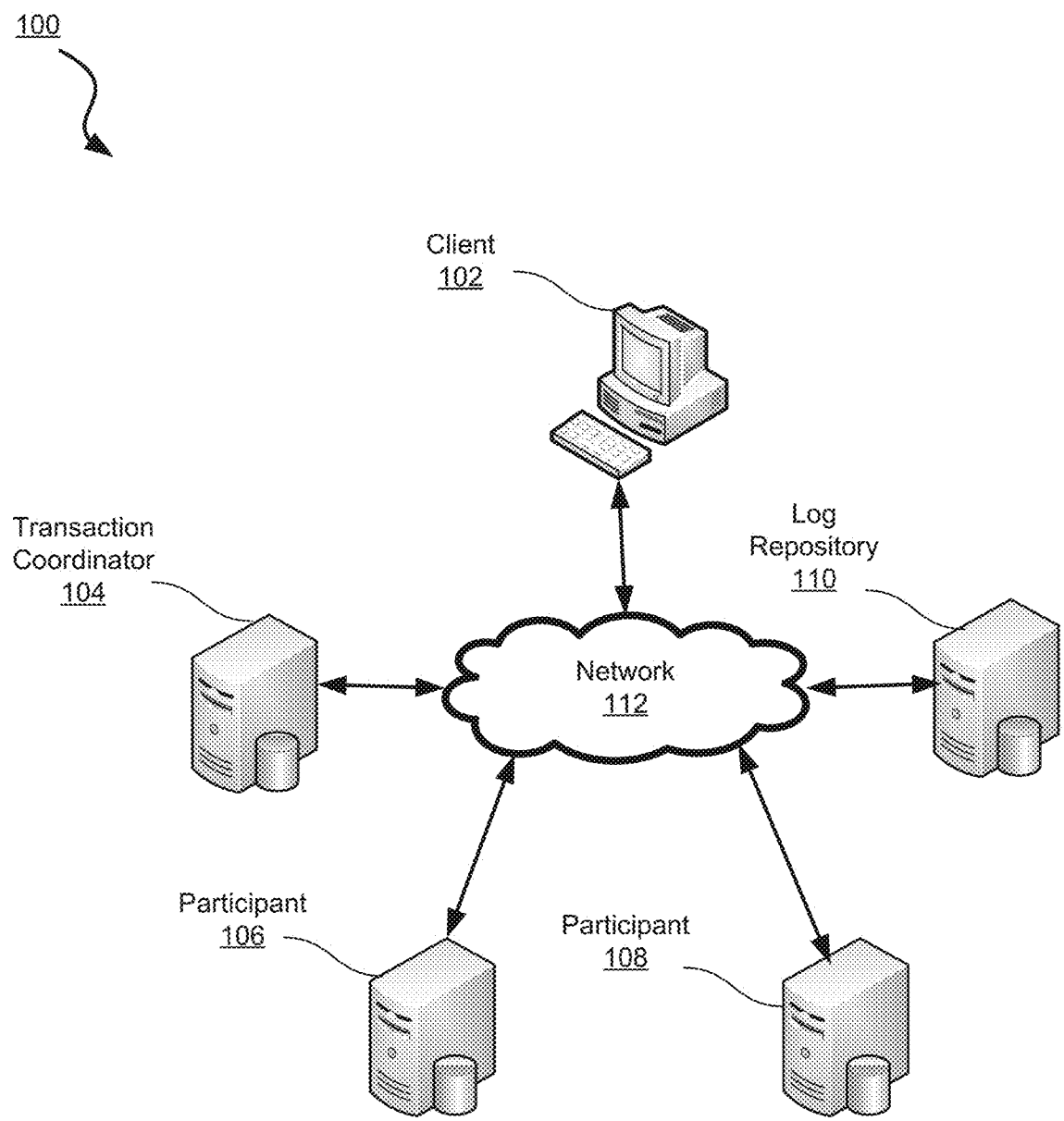
FIG. 1 is a block diagram illustrating a system architecture for transaction logging, in accordance with various examples of the present disclosure.

FIG. 1 illustrates an exemplary system architecture 100 for transaction logging in which examples of the present disclosure can be implemented.

System architecture 100 includes a client 102. Client 102 is a machine, such as a personal computer (PC), a tablet PC, a set-top box (STB), a Personal Digital Assistant (PDA), a cellular telephone or other mobile device, or any machine capable of executing a set of instructions (sequential or otherwise). Further, while one client is illustrated, the term client shall also be taken to include any collection of computing devices that individually or jointly execute a set (or multiple sets) of instructions to perform any one or more of the methodologies discussed herein. System architecture 100 may include a single client or plurality of clients.

Client 102 may run an operating system (OS) that manages hardware and software of the respective machine. The operating system may be any standard or proprietary OS. A browser may run on the OS of a client. The browser may be a web browser that can access content and services provided by transaction coordinator 104. Further, other types of software applications (e.g., applications, mobile applications, "apps") running on client 102 may provide access to content and services of transaction coordinator 104 without the use of a browser and/or without active human interaction.

The client 102 is communicatively coupled to the transaction coordinator 104. In the present example, the client 102 is structured to send transaction requests to the transaction coordinator 104. A user may use the client 102 to generate the transaction requests. The user may be identified on the client 102, such as a by a user account. In some examples, transaction requests include a client and/or user identifier.

The transaction coordinator 104 is structured to communicate with client 102, such as by receiving the requests and by responding to the requests. The transaction coordinator 104 is communicatively coupled to one or more participants (e.g., participant 106, participant 108) and a log repository 110.

The transaction coordinator 104, participant 106, participant 108 and log repository 110 each may represent one or more server machines that individually or jointly execute a set (or multiple sets) of instructions to perform any one or more of the methodologies discussed herein. Examples of server machines include enterprise servers, personal computers (PCs), and any machines capable of executing a set of instructions (sequential or otherwise). In the present example, the transaction coordinator 104, participant 106, participant 108 and log repository 110 are separate machines. In other examples, the one or more of the transaction coordinator 104, participant 106, participant 108 and log repository 110 may combined with another of the transaction coordinator 104, participant 106, participant 108 and log repository 110. For example, participants may operate as transaction coordinators and transaction coordinators may operate as participants. In other example, one or more of the transaction coordinator 104, participant 106 and participant 108 may store a log repository.

The client 102, transaction coordinator 104, participant 106, participant 108 and log repository 110 are communicatively coupled by a network 112. The network 112 may represent any combination or physical and/or wireless connections that form one or more networks. A network may be a public network (e.g., the Internet), a private network (e.g., a local area network (LAN) or wide area network (WAN)), or a combination thereof. In some examples, the network may include the Internet and/or one or more intranets, landline networks, wireless networks, and/or other appropriate types of communication networks. In some examples, the network may comprise a wireless telecommunications network (e.g., cellular phone network) adapted to communicate with other communication networks, such as the Internet. In some examples, the client 102 and transaction coordinator 104 are communicatively coupled by a public network, and the transaction coordinator 104, participants 106 and 108, and log repository 110 are communicatively coupled by a private network.

In the present example, the transaction coordinator 104 is structured to process transaction requests from client 102 using a transaction protocol with ACID properties, such as a two-phase commit protocol or a three-phase commit protocol. The protocol may include one or more optimizations, such as a presumed abort optimization. In response to receiving transaction requests from the client 102, the transaction coordinator 104 is structured to communicate with participant 106 and participant 108 in order to process the transaction.

Participant 106 and participant 108 are structured to receive the communications, and respond to the transaction coordinator 104 with responses to the communications. Participant 106 and participant 108 are structured to lock resources, such as particular data objects, in preparation for committing transactions to memory.

Both the transaction coordinator 104 and the participants 106 and 108 are structured to create transaction log entries corresponding to phases of the transaction. Transaction log entries may be structured with information such as operations performed, parameters of the operations, time/date (timestamp) information, state information (including current state and/or previous state), and originator information that may specify identification information corresponding to one or more of the user of the client 102, the client 102, the transaction coordinator 104, and participants 106 and 108.

One or more of the transaction coordinator 104 and the participants 106 and 108 are structured with "recovery" processes, which are used to perform recovery operations in the event of a failure of the transaction coordinator 104 and/or a participant 106 or 108. In the present example, recovery includes querying one or more of the transaction coordinator 104 and the participants 106 and 108 to determine the state of the transaction in order to resume the transaction processing at the appropriate state in the transaction. For example, if the failure occurred immediately following a first phase of a transaction, the transaction may be resumed at the first step after the first phase of the transaction.

In the present example, the transaction coordinator 104, participant 106 and participant 108 are also structured with log collection processes, which are used to send transactions logs to the log repository 110, either periodically, on an as-logged basis, or as configured by a user. In other examples, transaction logs may be moved to log repository 110 on a manual basis, or in response to requests from log repository 110. For example, transaction log entries of the transaction coordinator 104 may be stored in a particular file or database. The file or database, or one or more of the entries within the file or database, may be transferred to the log repository. The transferred log information may be then removed from the original location as part of a garbage collection process to free storage space.

In the present example, log repository 110 is structured to secure the transaction logs, such as by storing transaction log data in a protected vault that utilizes encryption of the transaction logs and/or implements user verification procedures, such as passcode or biometric authentication. The log repository 110 is structured such that the transaction logs are maintained in storage for later access. In some examples, the transaction logs are audited to determine information pertaining to prior transactions. The log repository 110 may be structured with search features in order to quickly sort and filter transaction log entries during the audit.

Figure 2:
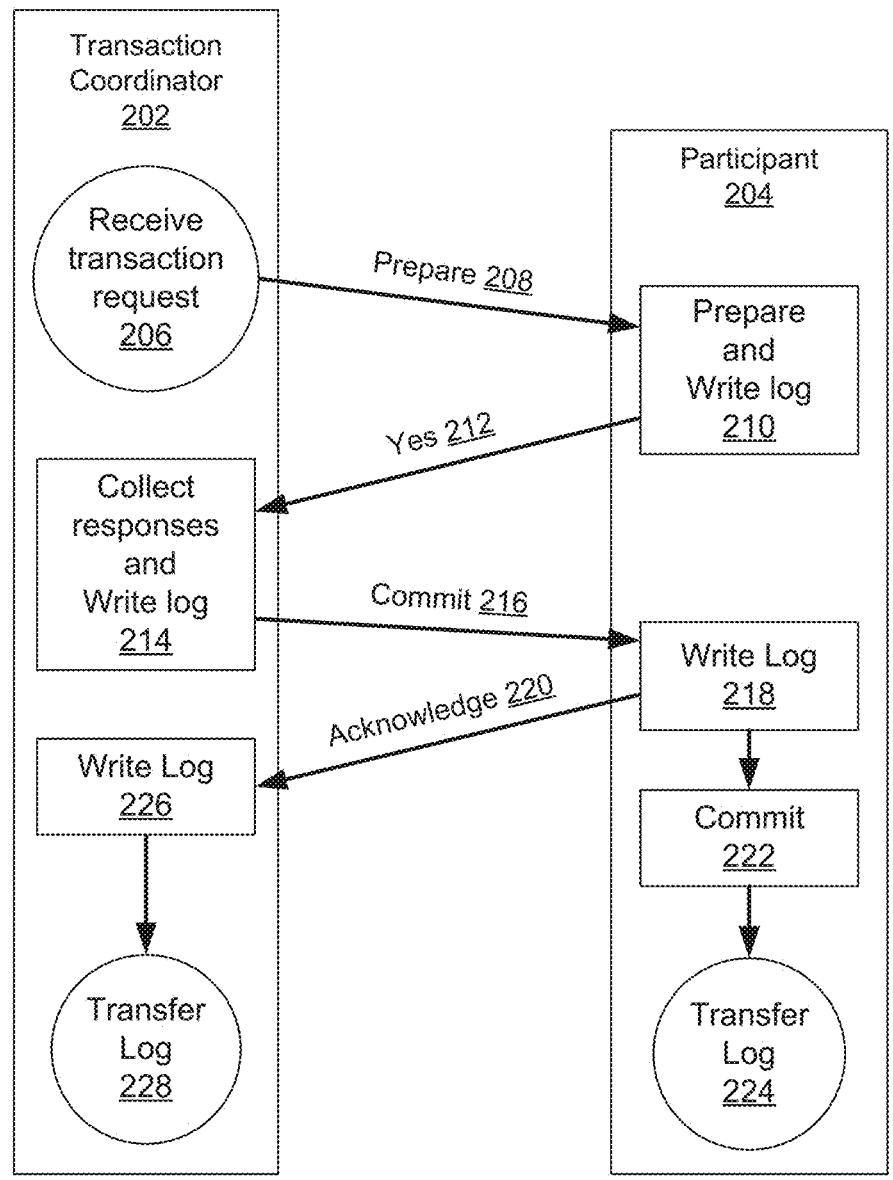
FIG. 2 is a flow diagram illustrating maintaining a transaction log for a committed transaction, according to an example of the present disclosure.

FIG. 2 is a flow diagram illustrating maintaining a transaction log for a committed transaction, according to an example of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

The present example illustrates a two-phase commit process implemented with a transaction coordinator 202 and a participant 204. In some examples there are a plurality of participants that operate according to a process similar or substantially the same as the process illustrated for participant 204. In some examples, the two-phase commit process is a "presumed nothing" two-phase commit where both aborts and commits are logged. In other examples, various optimizations may be implemented, such as presumed abort, allowing read only votes, presumed commit, and so forth, in order to reduce the number of transaction log entries and communications between the participants and the transaction coordinator. According to the particular optimization implemented, one or more of the below steps may be omitted or modified.

At block 206, the transaction coordinator 202 receives a request to begin a transaction from a client, which triggers a first phase of a two-phase commit process. The request to begin the transaction may include one or more of a client identifier and an identifier of a user of the client. The first phase is also referred to as the prepare phase.

The transaction coordinator 202 determines participants of the transaction and sends the participants a prepare request (also referred to as a prepare message) in order for the participants to prepare for the transaction. The participants of the transaction may be identified based on stored participant identifiers on the transaction coordinator 202. In the present example, the transaction coordinator 202 determines that there is a participant 204 corresponding to the transaction and sends the participant 204 a prepare request 208. In the present example, the prepare request 208 is sent via a network.

At block 210, the participant 204 receives the prepare request 208 and determines whether it is willing to commit the transaction. The determination may include querying resources corresponding to the transaction to identify whether the resources are available, and if so, whether the resources are able to be locked. Resources include, for example, files or databases that store data corresponding to the transaction. Resources may not be available if they are locked by another transaction process. If the resources are available, the participant 204 locks the resources and writes a transaction log entry. The locks are a preventative measure to protect the resources from being accessed by other transactions until the current transaction is complete. For example, the resource may be a database entry that is to be modified by the current transaction. Until the current transaction is complete, the database entry is protected from modification by other transactions.

In the present example, the participant 204 writes a transaction log entry to a memory location in a data store of the participant 204, such as a database or a flat file. The memory location may be a particular entry in the data store. The transaction log entry corresponds to the prepare request 208. The transaction log entry may include information such as a timestamp (which may include both the time and the date), operations performed by the participant 204 (e.g., receiving the prepare request 208, locking memory resources, operations that the participant is preparing to perform on the resource(s)), parameters of the operations, state information (e.g., the current and/or past state of the participant 204 and/or transaction coordinator 202), identification information corresponding to participant 204, the identity of the originator of the prepare request 208 (which in this example is transaction coordinator 202), and the identity of the originator of the request to begin the transaction. In some examples, the identity of the originator of the request to begin the transaction may be a client identifier. In other examples, the identity of the originator may be a user name or other user identifier of the user who generated the transaction request using the client. The user name may either be received explicitly in the request to begin the transaction, or may be inferred from other information in the request to begin the transaction, such as the client identifier and timestamp. In the present example, the transaction log entry is written after locking the resource(s) and prior to sending a response 212 to the transaction coordinator 202. In other examples, the transaction log entry may also be written prior to or simultaneous with the locking of the resources.

In the present example, after writing the transaction log entry, the participant 204 sends a "yes" response 212 to the prepare request 208. The "yes" response 212 identifies that the participant 204 is willing/prepared to commit the transaction. The "yes" response 212 may also be referred to as a "prepared" response.

At block 214, the transaction coordinator 202 waits to receive a response from the participant that was sent the prepare request 208. This step may also be referred to the collection or the voting phase, as the transaction coordinator 202 is collecting votes from the participants of the transaction. In the present example, the transaction coordinator 202 receives the "yes" response 212 from the participant 204. Since the participant 204 is the only participant in the present example, the transaction coordinator 202 determines that all participants are prepared for the transaction. Since all participants are prepared, phase two of the transaction begins. Phase two may also be referred to as the commit phase.

Once the transaction coordinator 202 determines that the participants are prepared to commit the transaction, the transaction coordinator 202 writes a transaction log entry to a memory location of the transaction coordinator 202, such as a database or a flat file. The transaction log entry may include information such as a timestamp (which may include both the time and the date), operations performed by the transaction coordinator 202 (e.g., receiving the responses from the participants), operations that the participants performed, parameters of the operations, state information (e.g., the current and/or past state of the participant 204 and/or transaction coordinator 202), identification information corresponding to transaction coordinator 202, the identity of the originator of the prepare response 208 (which in this example is participant 204), and the identity of the originator of the request to begin the transaction, such as a user or client identifier.

After writing the transaction log entry, the transaction manager 202 sends the participants of the transaction (in this example, participant 204) a commit request 216 (also referred to as a commit message).

At block 218, the participant 204 receives the commit request 216 and writes a transaction log entry to a memory location of the participant 204. The transaction log entry may include information such as a timestamp (which may include both the time and the date), operations performed or to be performed by the participant (e.g., receiving the commit request 216, committing the transaction), parameters of the operations, state information (e.g., the current and/or past state of the participant 204 and/or transaction coordinator 202), identification information corresponding to participant 204, identification information corresponding to the originator of the commit request 216 (which in this example is transaction coordinator 202), and identification information corresponding to the identity of the originator of the request to begin the transaction, such as a user or client identifier. The transaction log entry may be written to the same or a different data store than previously used in step 210.

After writing the transaction log entry, the participant 204 sends a response 220 that acknowledges receipt of the commit request 216. After sending the acknowledge response 220, the participant 204 commits the transaction at block 222. In the present example, committing the transaction at block 222 includes accessing the locked resource(s). In some examples, the access includes unlocking the resource(s) and performing a modification of a file or database to change one or more stored entries.

At block 224, following the commit 222 operation, the transaction log entries of the participant 204 corresponding to the transaction are moved from their original location in the participant's memory to a different location in the participant's memory. In some examples, the original location is a location in a first database and the different location is a location in a second database. In other examples, the first location may be a first file and the second location may be a second file. In yet other examples, the locations may be heterogeneous, such as the first location being a database and the second location being a file, and vice versa. In other examples, a transaction log entry may be moved from an original location in the participant's memory to a different machine, such as a log server.

In the present example, the transaction log entries are removed from their original location, such that if there is a failure, a transaction log entry is not taken as an indication that the transaction is still in process. For example, if a transaction log entry were not moved or deleted, a recovery process may conclude incorrectly that the transaction was not committed and attempt to commit the transaction again. Accordingly, the transaction log entries are removed from their first location to indicate that the transaction is complete, and stored in a second location to maintain the transaction log entries in storage.

Transaction log entries may be preserved for audit purposes, such that there is a record of the transaction that may be reviewed. The removing of a transaction log entry from the original location and the storing of a transaction log entry in the new location may be performed with a move operation. In some examples, the move operation may instead be a copy operation to copy the transaction log entry to the new location and a delete operation of the transaction log entry at the original location.

At block 226, the transaction coordinator 202 receives the acknowledgement response 220 from the participant 204 and writes a transaction log entry to a memory location of the transaction coordinator 202. The transaction log entry may include information such as a timestamp (which may include both the time and the date), operations performed by the transaction coordinator 202 (e.g., receiving the responses from the participants), parameters of the operations, state information (e.g., the current and/or past state of the participant 204 and/or transaction coordinator 202), identification information corresponding to transaction coordinator 202, identification information corresponding to the originator of the acknowledge response 220 (which in this example is participant 204), and identification information corresponding to the originator of the request to begin the transaction, such as a client or user identifier.

At block 228, following the write of the transaction log entry, the transaction log entries on the transaction coordinator 202 are moved from their original location in the transaction coordinator's memory to a different location in the transaction coordinator's memory. In some examples, the original location is a location in a first database and the different location is a location in a second database. In other examples, the first location may be a first file and the second location may be a second file. In yet other examples, the locations may be heterogeneous, such as the first location may be a database and the second location may be a file, and vice versa. In other examples, the transaction log entries may be moved from an original location in the transaction coordinator's memory to a different machine, such as a log server.

In the present example, the transaction log entries are removed from their original location, such that if there is a failure, a transaction log entry is not taken as an indication that the transaction is still in process. For example, if a transaction log entry were not moved or deleted, a recovery process may conclude incorrectly that the transaction was not committed and attempt to commit the transaction again. Accordingly, the transaction log entries are removed from their first location to indicate that the transaction is complete, and stored in a second location to preserve the transaction log entries.

Transaction log entries may be preserved for audit purposes, such that there is a record of the transaction that may be reviewed. The removing of a transaction log entry from an original location and the storing of the transaction log entry in the new location may be performed with a move operation. In some examples, the move operation may instead be a copy operation to copy the transaction log entry to the new location and a delete operation of the transaction log entry at the original location.

Figure 3:
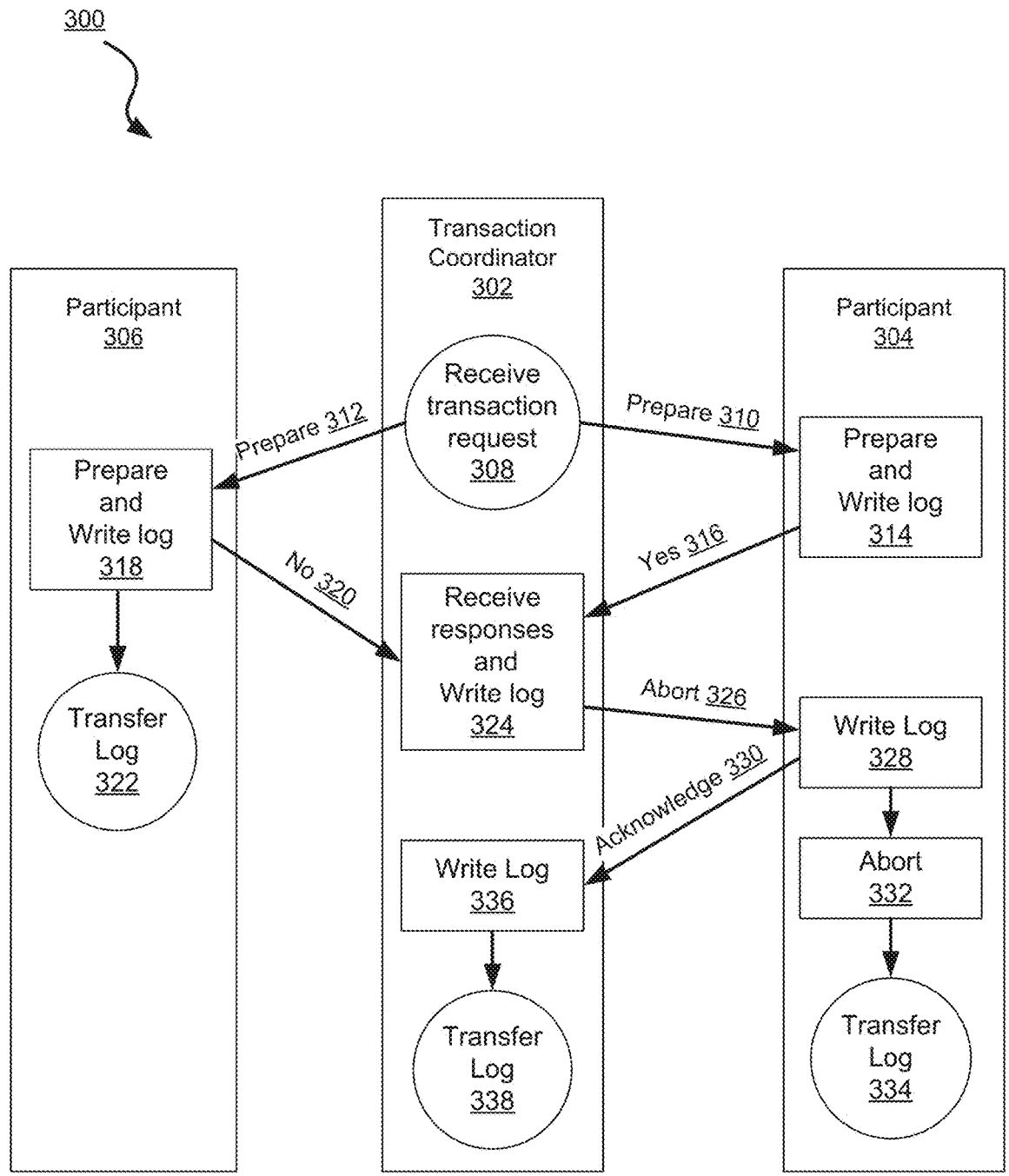
FIG. 3 is a flow diagram illustrating maintaining a transaction log for an aborted transaction, according to an example of the present disclosure.

FIG. 3 is a flow diagram illustrating maintaining a transaction log for an aborted transaction, according to an example of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

The present example illustrates a two-phase commit process implemented with a transaction coordinator 302, a participant 304 and a participant 306. In some examples there are additional participants in addition to participant 304 and participant 306 that operate according to a process similar or substantially the same as the process illustrated for participant 304 and participant 306. In some examples, the two-phase commit process is a "presumed nothing" two-phase commit where both aborts and commits are logged. In other examples, various optimizations may be implemented, such as presumed abort, allowing read only votes, presumed commit, and so forth, in order to reduce the number of transaction log entries and communications between the participants and the transaction coordinator. According to the particular optimization implemented, one or more of the below steps may be omitted or modified.

At block 308, the transaction coordinator 302 receives a request to begin a transaction, which triggers the first phase of a two-phase commit process. In the present example, the transaction coordinator 302 determines that there are two participants, participant 304 and participant 306, corresponding to the transaction and sends the participants prepare requests 310 and 312.

At block 314, the participant 304 receives the prepare request 310 and determines whether it is willing to commit the transaction. The determination may include determining whether resources, such as file and database entries, corresponding to the transaction are available. If the resources are available, the participant 304 locks the resources and writes a transaction log entry to a data store. The data store may be a database or a flat file that stores transaction log entries.

In the present example, the participant 304 writes a transaction log entry to a memory location in the data store of the participant 304, such as a database or a flat file. The memory location may be a particular entry in the data store. The transaction log entry corresponds to the prepare request 310. The log entry may include information such as a timestamp (which may include both the time and the date), operations performed by the participant 304 (e.g., receiving the prepare request 310, locking memory resources, operations that the participant is preparing to perform on the resource(s)), parameters of the operations, state information (e.g., the current and/or past state of the participant 304, participant 306 and/or transaction coordinator 302), identification information corresponding to participant 304, the identity of the originator of the prepare request 310 (which in this example is transaction coordinator 302), and the identity of the originator of the request to begin the transaction. In some examples, the identity of the originator of the request to begin the transaction may be a client identifier. In other examples, the identity of the originator may be a user name or other user identifier of the user who generated the transaction request using the client. The user name may either be received explicitly in the request, or may be inferred from other information in the request, such as the client identifier and timestamp. In the present example, the transaction log entry is written after locking the resource(s) and prior to sending a response 316 to the transaction coordinator 302. In other examples, the transaction log entry may also be written prior to or simultaneous with the locking of the resources.

In the present example, after writing the transaction log entry, the participant 304 sends a "yes" response 316 to the prepare request. The "yes" response identifies that the participant 304 is willing to commit the transaction and is prepared to commit the transaction. The "yes" response 316 may also be referred to as a "prepared" response.

At block 318, the participant 306 receives the prepare request 312 and determines whether it is willing to commit the transaction. In the present example, the resources corresponding to the transaction are already locked by another transaction. The participant 306 determines that it is therefore not willing to commit the transaction.

In the present example, the participant 306 writes a transaction log entry to a memory location in the data store of the participant 306, such as a database or a flat file. The memory location may be a particular entry in the data store. The transaction log entry corresponds to the prepare request 312. The transaction log entry may include information such as a timestamp (which may include both the time and the date), operations performed by the participant 306 (e.g., receiving the prepare request 312), parameters of the operations, state information (e.g., the current and/or past state of the participant 304, participant 306 and/or transaction coordinator 302), identification information corresponding to participant 306, the identity of the originator of the prepare request 312 (which in this example is transaction coordinator 302), and the identity of the originator of the request to begin the transaction. In some examples, the identity of the originator of the request to begin the transaction may be a user or client identifier.

In the present example, after writing the transaction log entry, the participant 306 sends a "no" response 320 to the prepare request 312. The "no" response 320 identifies that the participant 306 is not willing to commit.

At block 322, following the sending of the "no" response 320, the transaction log entries of the participant 306 are moved from their original location in the participant's memory to a different location in the participant's memory. In some examples, the original location is a location in a first database and the different location is a location in a second database. In other examples, the first location may be a first file and the second location may be a second file.

The removing of the transaction log entries from their original location and the storing of the transaction log entries in the new location may be performed with a move operation. In some examples, the move operation may instead be a copy operation to the new location and a delete operation of the transaction log entries at the original location.

At block 324, the transaction coordinator 302 waits to receive the responses from the participants that were sent the prepare request. This step may also be referred to the voting phase, as the transaction coordinator 302 is determining which participants voted "yes" to the transaction. In the present example, the transaction coordinator 302 receives the "yes" response 316 from the participant 304 and the "no" response 320 from the participant 306. Since all of the participants were not willing to commit the transaction, the transaction is aborted in phase two of the two-phase commit process.

The transaction coordinator 302 writes a transaction log entry. In the present example, the transaction coordinator 302 writes a transaction log entry to a memory location of the transaction coordinator 302, such as a database or a flat file. The transaction log entry may include information such as a timestamp (which may include both the time and the date), operations performed by the transaction coordinator 302 (e.g., receiving the responses from the participants), operations that the participants performed, parameters of the operations, state information (e.g., the current and/or past state of the participant 304, participant 306 and/or transaction coordinator 302), identification information corresponding to transaction coordinator 302, the identity of the originators of the "yes" and "no" responses 316 and 320, respectively (which in this example are participant 304 and participant 306), and the identity of the originator of the request to begin the transaction, such as a user or client identifier.

After writing the transaction log entry, the transaction manager 302 sends the participants of the transaction that sent a "yes" response (in this example, participant 304) an abort request 326 (also referred to as an abort message).

At block 328, the participant 304 receives the abort request 326 and writes a transaction log entry. In the present example, the participant 304 writes a transaction log entry to a memory location in the data store of the participant 304, such as a database or a flat file. The memory location may be a particular entry in the data store. The transaction log entry corresponds to the abort request 326. The transaction log entry may include information such as a timestamp (which may include both the time and the date), operations performed by the participant 304 (e.g., receiving the abort request 304), parameters of the operations, state information (e.g., the current and/or past state of the participant 304, participant 306 and/or transaction coordinator 302), identification information corresponding to participant 304, the identity of the originator of the abort request 326 (which in this example is transaction coordinator 302), and the identity of the originator of the request to begin the transaction. In some examples, the identity of the originator of the request to begin the transaction may be a user or client identifier.

After writing the transaction log entry, the participant 304 sends an "acknowledge" response 330 that acknowledges receipt of the abort request 326. After sending the "acknowledge" response 330, the participant 304 aborts the transaction at block 332. In the present example, aborting the transaction at block 332 includes unlocking any resources previously locked in block 314.

At block 334, following the abort 332 operation, the transaction log entries of the participant 304 are moved from their original location in the participant's memory to different location in the participant's memory. In some examples, the original location is a location in a first database and the different location is a location in a second database. In other examples, the first location may be a first file and the second location may be a second file.

The removing of a transaction log entry from the original location and the storing of the transaction log entry in the new location may be performed with a move operation. In some examples, the move operation may instead be a copy operation to the new location and a delete operation of the transaction log entry at the original location.

At block 336, the transaction coordinator 302 receives the acknowledgement response 330 from the participant 304 and writes a transaction log entry.

The transaction log entry may include information such as a timestamp (which may include both the time and the date), operations performed by the transaction coordinator 302 (e.g., receiving the responses from the participants), parameters of the operations, state information (e.g., the current and or past state of the participant 304, the participant 306 and/or transaction coordinator 302), identification information corresponding to transaction coordinator 302, the identity of the originator of the acknowledge response 330 (which in this example is participant 304), and the identity of the originator of the request to begin the transaction.

At block 338, following the write of the transaction log entry, the transaction log entries on the transaction coordinator 302 corresponding to the transaction are moved from their original location in the transaction coordinator's memory to different location in the transaction coordinator's memory. In some examples, the original location is a location in a first database and the different location is a location in a second database. In other examples, the first location may be a first file and the second location may be a second file.

The removing of a transaction log entry from the original location and the storing of the transaction log entry in the new location may be performed with a move operation. In some examples, the move operation may instead be a copy operation to the new location and a delete operation of the transaction log entry at the original location.

Figure 4:
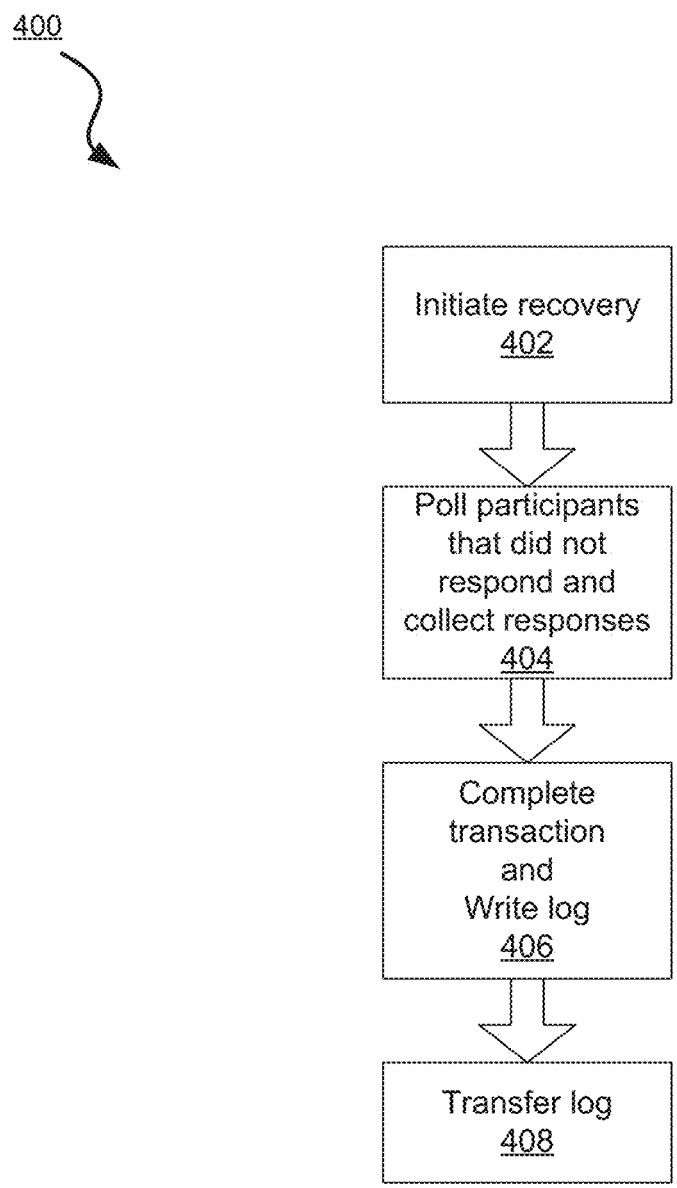
FIG. 4 is a flow diagram illustrating maintaining a transaction log during a recovery process, in accordance with various examples of the present disclosure.

FIG. 4 is a flow diagram illustrating a transaction log during a recovery process, according to an example of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

During a transaction, one or more of the transaction manager and participants may fail. For example, a process or an entire machine may crash. Accordingly, a recovery process is initiated on the transaction manager and/or participant that failed during the transaction.

At block 402, the recovery process is initiated. In some examples, the recovery process is initiated automatically, such as upon restart of the application or process that failed.

At block 404, the recovery process determines the state of the transaction by querying transaction logs. For example, the recovery process may query the transaction logs to identify the participants and/or transaction manager that have not responded to a prepare or commit request. Responses are collected from the participants and/or transaction manager to identify the current state of the transaction.

At block 406, the recovery process initiates the completion of the transaction from the current state. For example, if the failure occurred immediately prior to a commit, then the commit may be performed.

Transaction log entries are written based on the particular steps in the transaction, as identified in the prior examples. Transaction log entries may include information such as a timestamp (which may include both the time and the date), operations performed, parameters of the operations, state information (e.g., the current and or past state of the participants and/or transaction coordinator), identification information corresponding to transaction coordinator and/or participants, and the identity of the originator of the request to begin the transaction.

At block 408, following the write of a last transaction log entry identifying that the transaction is complete, the transaction log entries corresponding to the transaction are moved from their original location to a different location.

Figure 5:
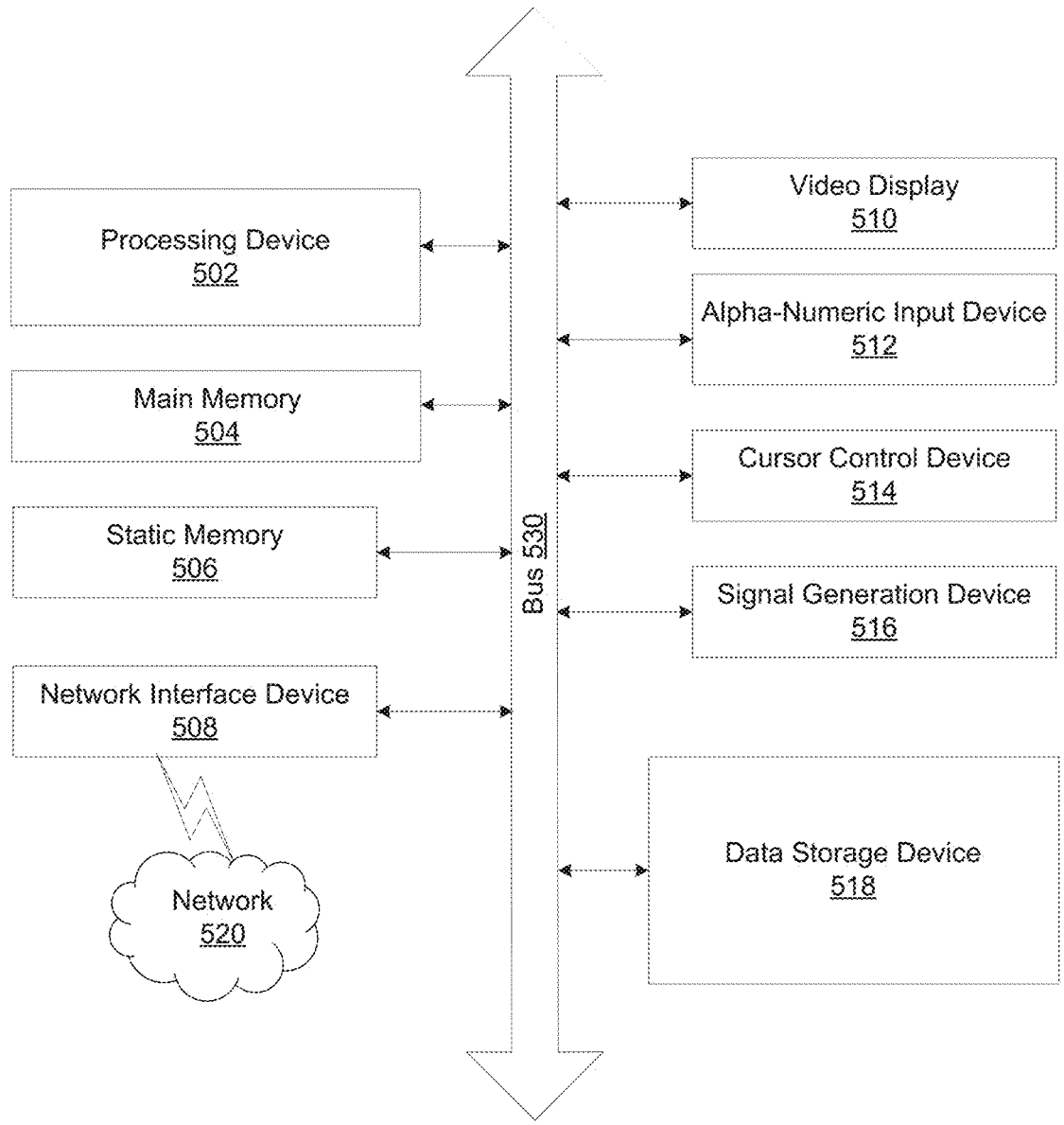
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for maintaining transaction logs during a two-phase commit process, the method comprising:

receiving, at a transaction coordinator, a request to commit a transaction;

sending, from the transaction coordinator, a prepare message to a participant;

determining whether the participant is willing to commit the transaction based on the participant querying the availability of at least one resource corresponding to the transaction and determining that the at least one resource is available;

in response to determining that the participant is willing to commit the transaction, locking the at least one resource, the locking including protecting the at least one resource from being accessed by at least one other transaction until the transaction is complete;

receiving, at the transaction coordinator, a response to the prepare message from the participant, the response to the prepare message identifying that the participant is prepared to commit the transaction;

based on the receiving the response to the prepare message, writing, at the transaction coordinator, a first transaction log entry to a first location in memory of the transaction coordinator;

sending, from the transaction coordinator, a commit message to the participant;

receiving, at the transaction coordinator, a response to the commit message from the participant;

based on the receiving the response to the commit message, writing at the transaction coordinator a second transaction log entry to a second location in memory of the participant, wherein a second location type and a first location type are heterogeneous, and wherein the second transaction log entry identifies a first timestamp, a first operation, a parameter of the first operation, a first previous state of the transaction coordinator, a transaction coordinator identifier, and an originator; and following the writing, preserving the first transaction log entry and the second transaction log entry by moving the first transaction log entry from the first location and the second location to a third location, wherein the moving includes deleting the first transaction log entry at the first location and deleting the second transaction log entry at the second location;

committing, at the participant, the transaction by accessing the at least one resource, wherein accessing the resource includes unlocking the at least one resource, the at least one resource having been a locked resource.

2. The method of claim 1, further comprising:
receiving, at the participant, the prepare message;
writing, at the participant, a second transaction log entry to a fourth location, wherein the second transaction log entry identifies a second timestamp, a second operation, a parameter of the second operation, a second previous state, and the originator;
sending, from the participant, the response to the prepare message to the transaction coordinator;
receiving, at the participant, the commit message from the transaction coordinator;
writing, at the participant, a third transaction log entry to a fifth location, wherein the third transaction log entry identifies a third time, a third operation, a parameter of the third operation, a third previous state, and the originator;
sending, from the participant, the response to the commit message to the transaction coordinator; and
moving the second transaction log entry from the fourth location to a sixth location; and
moving the third transaction log entry from the fifth location to a seventh location.

3. The method of claim 1, wherein the second location is a database entry in a first database, and wherein the third location is a database entry in a second database.

4. The method of claim 1, wherein the second location is in a first file, wherein the third location is in a second file.

5. The method of claim 1, further comprising:
sending the first transaction log entry to a log server.

6. The method of claim 1, further comprising:
encrypting the first transaction log entry.

7. The method of claim 1, further comprising:
based on the originator, identifying a user that generated the request to commit the transaction.

8. A non-transitory computer-readable medium for storing transaction logs in a two-phase commit protocol environment configured with a presumed-abort optimization, comprising computer-readable instructions, the computer-readable instructions executable by a processor to cause the processor to:
receive a request to commit a transaction;
send a first message to a participant;
determine whether the participant is willing to commit the transaction based on the participant querying the availability of at least one resource corresponding to the transaction and determining that the at least one resource is available;
in response to determining that the participant is willing to commit the transaction, locking the at least one resource, the locking including protecting the at least one resource from being accessed by at least one other transaction until the transaction is complete;
receive a response to the first message from the participant, the response to the first message identifying that the participant is prepared to commit the transaction;
based on the response to the first message, write a first transaction log entry to a first location in memory of the transaction coordinator;
send, from a transaction coordinator, a second message to the participant to commit the transaction;
receive, at the transaction coordinator, a response to the second message from the participant;
based on the response to the second message, write a second transaction log entry to a second location in memory of the participant, wherein a second location type and a first location type are heterogeneous, and wherein the second transaction log entry identifies a first timestamp, a first operation, a parameter of the first operation, a first previous state of the transaction coordinator, a transaction coordinator identifier, and an originator; and
following the writing of the first transaction log entry and the writing of the second transaction log entry, preserve the first transaction log entry and the second transaction log entry by moving the first transaction log entry from the first location to a third location and the second transaction log entry from the second location to a fourth location, wherein the moving includes deleting the first transaction log entry at the first location and deleting the second transaction log entry at the second location.

9. The non-transitory computer-readable medium of 8, wherein the first location is a database entry in a first database, and wherein the third location is a database entry in a second database.

10. The non-transitory computer-readable medium of claim 8, wherein the first location is in a first file, wherein the third location is in a second file.

11. The non-transitory computer-readable medium of claim 8, the computer-readable instructions executable to cause the processor further to:
encrypt the first transaction log entry; and
send the first transaction log entry to a log server.

12. A transaction system comprising:
a transaction coordinator having a processor and a memory, the transaction coordinator to process a transaction by:
writing a first commit transaction log entry to a first memory location in memory of the transaction coordinator, wherein the first commit transaction log entry identifies a first timestamp, a first operation, a first parameter of the first operation, a previous state of the transaction coordinator, a transaction coordinator identifier, and an originator; and
following the writing of the first commit transaction log entry, preserve the first commit transaction log entry by moving the first commit transaction log entry from the first memory location to a second memory location wherein a second memory location type and a first memory location type are heterogeneous, wherein the moving includes deleting the first transaction log entry at the first location; and
a participant communicatively coupled to the transaction coordinator, the participant to process the transaction by:
writing a prepare transaction log entry to a third memory location;
writing a second commit transaction log entry to a fourth memory location in memory of the participant;
following the writing of the prepare transaction log entry, preserve the prepare transaction log entry by moving the prepare transaction log entry from the third memory location to a fifth memory location, wherein the moving includes deleting the prepare transaction log entry at the third location; and following the writing of the second commit transaction log entry, preserve the second commit transaction log entry by moving the second commit transaction log entry from the fourth memory location to a sixth memory location.

13. The system of claim 12, further comprising:

a log server communicatively coupled to the transaction coordinator and the participant, the log server to receive the first commit transaction log entry, the prepare transaction log entry, and the second commit transaction log entry.

14. The system of claim 13, the log server further to:

encrypt the first commit transaction log entry, the prepare transaction log entry, and the second commit transaction log entry.

15. The system of claim 12, wherein the first memory location is a database entry in a first database, wherein the second memory location is a database entry in a second database.

16. The system of claim 12, wherein the first memory location is a first file, wherein the second memory location is a second file.

17. The system of claim 12, further comprising:

at the transaction coordinator, identifying a user that originated a request corresponding to the transaction.

18. The system of claim 12, wherein the prepare transaction log entry includes a second time, a second operation, and a parameter of the second operation, and wherein the second commit transaction log entry includes a third time, a third operation, and a parameter of the third operation.

19. The non-transitory computer-readable medium of claim 8, the computer-readable instructions executable to cause the processor further to:

based on an originator, identify a user that generated the request to commit the transaction.

20. The system of claim 12, wherein the first memory location is a database entry in a first database, wherein the third memory location is a first file.

* * * * *